No. 608,674. Patented Aug. 9, 1898.
D. L. HARSHNER.
BICYCLE GEAR.
(Application filed Apr. 12, 1897.)
(No Model.) 2 Sheets—Sheet 1.
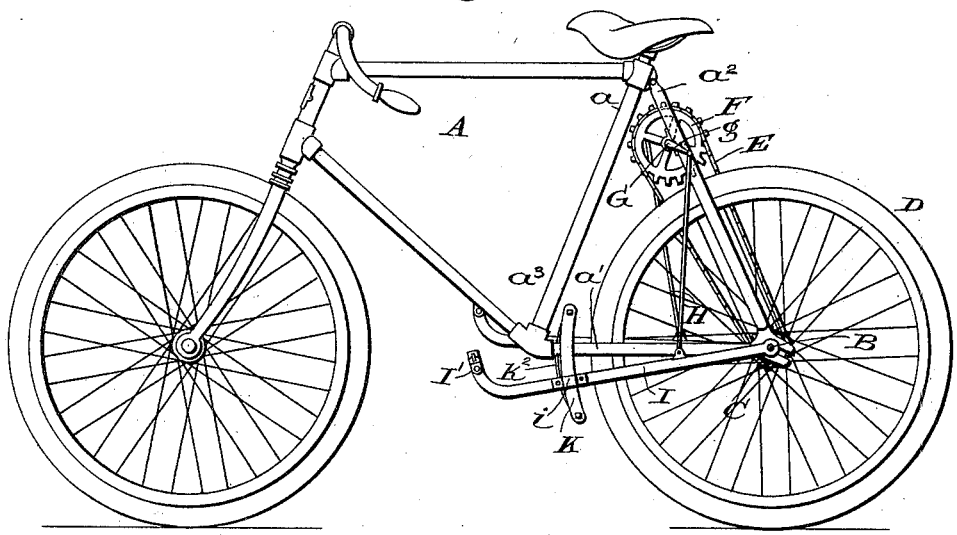
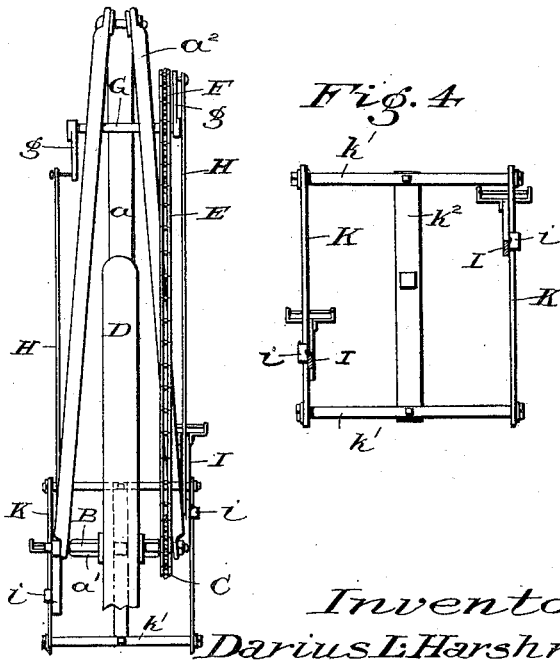
Witnesses:
Inventor:
Darius L. Harshner.
By his Atty:—

No. 608,674. Patented Aug. 9, 1898.
D. L. HARSHNER.
BICYCLE GEAR.
(Application filed Apr. 12, 1897.)
(No Model.) 2 Sheets—Sheet 2.
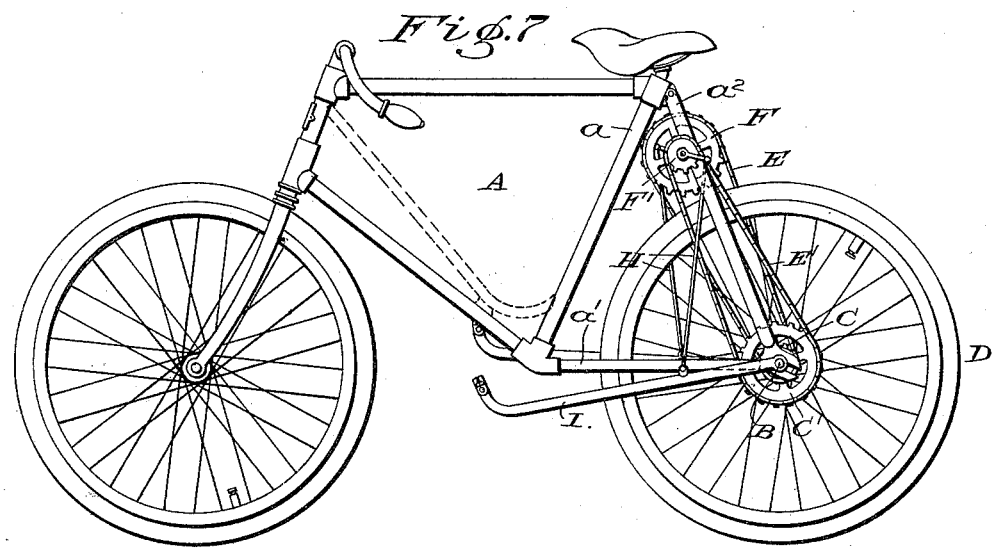
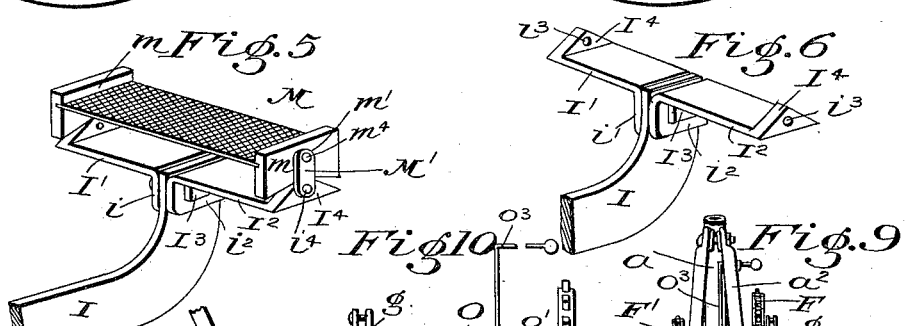
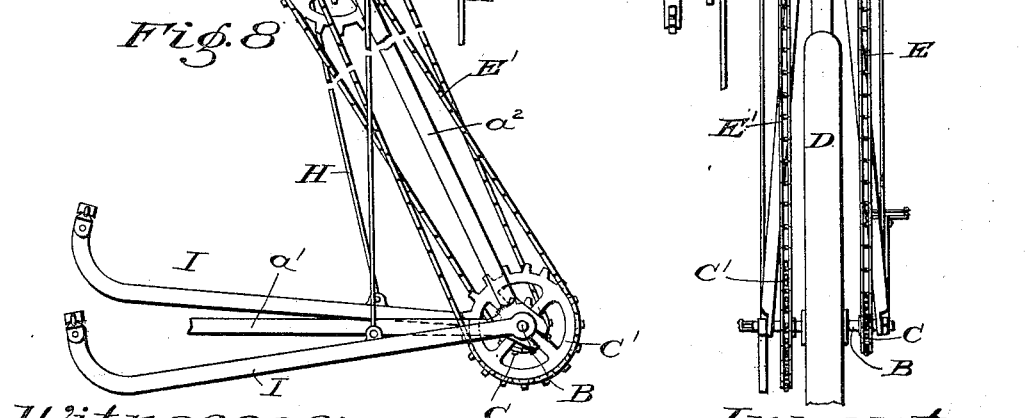
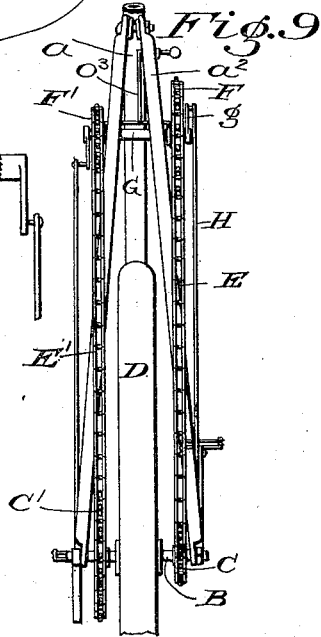
Witnesses:— Inventor
Darius L. Harshner.
By his Atty.
THE NORRIS PETERS CO., PHOTO-LITHO., WASHINGTON, D. C.

UNITED STATES PATENT OFFICE.

DARIUS L. HARSHNER, OF ETNA GREEN, INDIANA.

BICYCLE-GEAR.

SPECIFICATION forming part of Letters Patent No. 608,674, dated August 9, 1898.

Application filed April 12, 1897. Serial No. 631,720. (No model.)

*To all whom it may concern:*

Be it known that I, DARIUS L. HARSHNER, a citizen of the United States, residing at Etna Green, in the county of Kosciusko and State of Indiana, have invented certain new and useful Improvements in Bicycle-Gears, of which the following is a specification.

My invention relates to driving-gear for bicycles wherein pedal-levers supported upon the rear axle are connected to a shaft geared to said axle in such manner that the speed may be increased without correspondingly increasing the speed of the pedals and the movement of the pedals may be vibratory instead of rotary, thus enabling the rider to apply the power with a direct downward pressure and also propel the wheel from one side only when desired.

The object of my invention is to arrange the levers and so connect them with the gear-shaft and axle that the levers may be connected to the sprocket-wheels and guided in their movement in a suitable manner; and a further object of my invention is to provide my improved pedal mechanism with a changeable-speed gear; and the invention consists in certain novel features of construction and combinations and arrangements of parts, as hereinafter set forth, and pointed out in the claims.

In the accompanying drawings, Figure 1 is a side elevation of a bicycle having some of my improvements applied thereto; Fig. 2, a rear end view thereof; Fig. 3, an enlarged vertical sectional detail of the guides for the vibratory ends of the pedal-levers; Fig. 4, a rear elevation of said parts; Fig. 5, an enlarged perspective view of the forward end of the pedal-lever; Fig. 6, a similar view of the same with the pedal attached; Fig. 7, a side elevation of a bicycle, showing my improved treadle-gear and a changeable-speed gear connected therewith; Fig. 8, an enlarged side view of my improved gear and parts of the frame to which it is connected; Fig. 9, a rear elevation of the parts shown in Fig. 7, and Fig. 10 a rear elevation in detail of the crank-shaft and changeable-speed connections.

The bicycle A has the ordinary diamond frame, the seat-post $a$, back fork $a'$, and rear bars $a^2$ forming a triangle, the rear lower corner of which supports the rear-wheel axle B in the usual way.

A sprocket-wheel C is secured to the hub of the rear wheel D, and a chain E leads to a sprocket-wheel F, secured to a crank-shaft G, supported in bearings upon the inner sides of the rear bars $a^2$ of the frame. The ends of the shaft G have crank-levers $g$ $g$ secured thereto, which are connected by rods H with the middle part of vibratory pedal-levers I, pivoted to the ends of the rear-wheel axle B in a suitable manner to allow the levers to swing freely upon each side of the frame in close proximity thereto. The ends of the levers I between the connecting-rods and pedals have a strap $i$ secured upon the inner sides thereof, which receive segment guide-strips K, secured at their upper and lower ends, respectively, to tubular bars $k'$, supported at the middle one above the other by a bracket-plate $k^2$, secured by a screw-bolt fitted into a hub projecting from the frame coupling-piece $a^3$, as clearly shown in Figs. 3 and 4, the guide-strips K being preferably made of hard wood, bored at their ends and held to the tubular bars $k'$ by stud-bolts screwing into the ends thereof. The pedal-levers may thus be held to swing freely without danger of striking the frame or of becoming twisted or displaced.

The free ends of the pedal-levers I have brackets I' I², each provided with angular abutment ends $i'$ $i^2$, which are held securely upon the upturned end of the said pedal-lever by a bolt and nut I³, passing through them. The outer ends of the brackets I' I² have upturned angle-bearings I⁴, the said bearings being V-shaped and provided with holes $i^3$ to receive screw-pins $i^4$, and pedal-blocks M, having angular recessed end blocks $m$, also provided with holes $m'$ to receive screw-pins $m^4$, are held upon the brackets I' I² to rock thereon by links M', which allow the pedals a limited movement and a firm foothold upon the end of the lever.

The changeable-speed gear consists of a second set of sprocket-wheels C' and F', placed, respectively, upon the rear-wheel hub and the crank-axle and connected with each other by a chain E', the said wheels being of suitable diameters to obtain the required speed.

The sprocket-wheels F and F' each have a clutch which engages with a corresponding clutch upon the inner faces of the crank-hubs, suitable keys upon the shaft permitting the clutches to slide upon the shaft and the crank-levers being securely fastened to the ends of the said shaft. The sprocket-wheels have grooved hubs $f f'$, respectively, which receive pins $o'$, upon projecting from a shifting bar O, adapted to slide endwise in bearings $o^2$ on the rear bars of the frame, and a rod $o^3$, secured to said shifting bar, allows the sprocket-wheels to be shifted from one side to the other to engage with either of said cranks, the crank-shaft being held from endwise movement by collars $g'$, secured thereon, upon the inner side of the bearings of the frame.

A wheel thus driven may be geared for power to climb grades easily or be changed to increase the speed upon even ground.

I claim as my invention and desire to secure by Letters Patent—

1. In a bicycle, in combination with the frame, of the rear wheel and axle, a sprocket-wheel upon the axle, a crank-shaft journaled in suitable bearings carried by the frame, a sprocket-wheel thereon, a sprocket-chain connecting said sprocket-wheels, pedal-levers pivotally secured to the rear axle, rods connecting the cranks of the crank-shaft and the pedal-levers, straps $i$ carried by the pedals, guide-strips K supported by and located upon each side of the frame which are embraced by the straps $i$ whereby the pedal-arms are guided, said guide-strips forming the sides of a rectangular frame, a vertical plate $k^2$ connecting the upper and lower members thereof, an orifice in the plate $k^2$ and a screw passing through the orifice and into a hub projection upon the frame of the bicycle, substantially as described.

2. In a bicycle-bearing, the combination with the pedal-levers of bracket-plates, secured to the end thereof, having V-shaped bearing edges, a pedal-plate having end bearings correspondingly recessed and sloped to rest upon said V-shaped bearing, and links connecting the said bearings and the ends of the bracket-plates, substantially as described.

In testimony that I claim the foregoing as my invention I have signed my name in the presence of two subscribing witnesses.

DARIUS L. HARSHNER.

Witnesses:
 WESLEY TAYLOR,
 THOMAS SHENEFIELD.